(12) United States Patent
Imhof (10) Patent No.: US 8,297,264 B2
(45) Date of Patent: Oct. 30, 2012

(54) ADAPTIVE PRESSURE CONTROL VALVE WITH VARIABLE SWITCHING POINT

(75) Inventor: Carl Stefan Imhof, Neu-Ulm (DE);
 Carl Imhof, legal representative, Illerkirchberg (DE); Marlies Imhof, legal representative, Illerkirchberg (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 626 days.

(21) Appl. No.: 12/485,109

(22) Filed: Jun. 16, 2009

(65) Prior Publication Data
 US 2009/0308337 A1   Dec. 17, 2009

(30) Foreign Application Priority Data

Jun. 16, 2008  (DE) .................. 10 2008 028 543

(51) Int. Cl.
 *F16K 31/126* (2006.01)
 *F01M 13/00* (2006.01)
 *F01M 13/04* (2006.01)
 *G05D 16/06* (2006.01)

(52) U.S. Cl. ....................... 123/574; 137/501
(58) Field of Classification Search ............... 137/501, 137/509, 510, 906, 907, 488; 123/572–574
 See application file for complete search history.

(56) References Cited

U.S. PATENT DOCUMENTS

| 4,580,543 | A * | 4/1986 | Aoki ............................. 123/574 |
| 5,090,393 | A * | 2/1992 | Holch .......................... 123/574 |
| 5,335,641 | A * | 8/1994 | Schnabel ..................... 123/574 |
| 6,158,423 | A * | 12/2000 | Haack .......................... 123/574 |
| 6,651,636 | B1 * | 11/2003 | Albright ...................... 123/574 |
| 6,695,005 | B2 * | 2/2004 | Ottestad ....................... 137/488 |
| 6,802,303 | B2 * | 10/2004 | Håkansson .................. 123/574 |
| 6,923,204 | B2 * | 8/2005 | Dalton et al. ................ 137/489 |
| 7,025,049 | B2 * | 4/2006 | Pietschner .................... 123/572 |
| 7,174,882 | B2 * | 2/2007 | Hezel et al. .................. 123/574 |
| 7,677,229 | B2 * | 3/2010 | Lemke et al. ................ 123/574 |
| 2003/0116196 | A1 * | 6/2003 | Sasao ........................... 137/501 |
| 2007/0163657 | A1 * | 7/2007 | Yoshino et al. .............. 137/510 |

FOREIGN PATENT DOCUMENTS

| DE | 10044922 B4 | 4/2002 |
| DE | 10321211 A1 | 12/2004 |
| DE | 10 2005 038 257 A1 | 2/2007 |
| DE | 10 2006 051 143 A1 | 5/2008 |
| EP | 0724206 A2 | 7/1996 |

* cited by examiner

Primary Examiner — M. McMahon
(74) Attorney, Agent, or Firm — Marshall & Melhorn, LLC (57) ABSTRACT

A valve for the control of a gas stream is provided with a valve housing enclosing a valve chamber. At least one pressure-sided inlet and at least one suction-sided outlet is provided with a valve opening between them to link them. An elastically movable control membrane is arranged at the valve housing which reduces or increases the flow cross section in the area of the at least one valve opening and/or opens or closes the at least one valve opening. A first device exerts a first further force on the control membrane in such a way that with an increasing pressure difference the further force exerted by the first device on the control membrane in opposite direction to the closure direction of the valve increases.

13 Claims, 6 Drawing Sheets

ADAPTIVE PRESSURE CONTROL VALVE WITH VARIABLE SWITCHING POINT

FIELD OF THE INVENTION

The present invention relates to a valve for the control of a flow of gas.

BACKGROUND OF THE INVENTION

Valves for the control of a flow of gas are especially used in ventilating systems, especially for crankcases of combustion engines. There, they are arranged in the main streaming way of the gases from the crankcase to a suction compartment of the combustion engine, through which the blow-by gases of the combustion engine are guided back to the suction compartment.

Pressures control valves are however not only used in these areas. In general, they are used for the pressure reduction and control in gas ducts. According to the state of the art, pressure control valves comprise a connection that is charged with negative pressure (an outlet) and a connection that is charged with overpressure (inlet). Using a control membrane, a closing body is actuated which closes and opens, respectively, a valve opening arranged within the valve. The pressure on the inlet and outlet of the valve is set dependent on the pressures and therefore the forces which charge the pressure control membrane. This, for instance in the crankcase ventilation duct of a combustion engine aims on maintaining an allowed pressure, usually a small negative pressure relative to the atmospheric outside pressure whereas both too high and too negative pressure values inside of the crankcase have to be avoided.

Simple pressure control valves known in the state of the art in their open state need to have a small flow resistance for the flowing gases so that the outlet cross section (especially of the valve opening) has to be chosen large if possible.

The closing and opening behaviour of a pressure control valve can be described by help of a load deflection curve. The load deflection curve which in its course describes the closed and the opened state of the valve is obtained for a particular pressure control valve for a crankcase ventilation by plotting the suction pressure on the outlet to the x-coordinate and the overpressure at the inlet to the y-coordinate. There, it is assumed that in the negative x-direction, more negative thus higher suction pressures and in the positive y-direction, higher pressures at the inlet of the valve or at another position within the valve are plotted.

The area of the load deflection curve which describes the completely open state of the valve corresponds to a line through the origin in the first and third quadrant of the Cartesian coordinate system. If in the flow way of the valve between the inlet and the outlet, pressure reducing elements are present this leads to a vertical upward shift of the load deflection line. Such pressure reducing elements in this area of the curve thus cause a y-intercept different from zero.

In the third quadrant this load deflection line passes into an area which describes an increasingly closed state of the valve. This zone of the deflection line of the valve depends on the ratio of the areas of the effective area of the control membrane, which is charged with the present pressure and the outlet cross section of the valve opening onto which in the closed state the outlet-sided pressure acts. This area should be as large as possible, in order that the load deflection line of the valve in this area is as flat as possible, thus preferably parallel to the abscissa. For a high ratio of areas however, the membrane has to be very large and/or the cross section of the valve opening to be small. A small outlet cross section is in contradiction to the above mentioned requirement of a large outlet cross section. Moreover, a large membrane is related to the drawbacks of high cost and large-volume structural shape.

Even with a relatively flat load deflection line, with conventional pressure control valves, it is still possible that due to further flow resistances arranged in the ventilation duct, such as oil separators, with high volume streams, unacceptably high pressures occur in the crankcase. By use of a spring which counteracts the closing of the valve, it is possible to reduce the unacceptably high pressure values to a predetermined value. This is however related to the drawback that at low volume streams, unacceptably low pressures can occur in the crankcase, as the force provided by the spring for counteracting the closure has to be overcome first.

Therefore, it is the object of the present invention to provide a valve that prevents from the above mentioned problems and especially provides an opportunity to regulate the outlet-sided pressures in such a way that they remain the same or almost the same independent of the volume stream guided through the valve at otherwise unchanged conditions. It is a further object of the present invention to provide a corresponding ventilation system, a corresponding combustion engine and a corresponding use of the valve according to the invention.

The above objects are achieved by the invention defined in the appended independent claims. Advantageous embodiments of the valve according to the invention as well as of the ventilation system according to the invention are given in the respective subordinate claims.

EP 0 724 206 A2 shows a valve where in addition to the control membrane an auxiliary membrane is given. This auxiliary membrane on one of its sides is charged with the suction pressure as it statically results at the valve disk and on its other side is charged with the atmospheric pressure as the reference pressure. Under normal operating conditions, at which the suction pressure is smaller than the reference pressure, the auxiliary membrane counteracts the closure movement of the valve. EP 0 724 206 A2 further describes that through use of such an auxiliary membrane, the pressure inside of the crankcase can be regulated more independent of the suction pressure in the intake section.

DE 103 21 211 A1 discloses a valve where in addition to the control membrane, an additional membrane is given as well. In contrast to EP 0 724 206 A2, the additional membrane on one of its sides is charged with a force produced in an electromagnetic balancing device that is independent of the crankcase pressure and on its other side by the atmospheric pressure as a reference pressure. By a mechanical coupling of the additional membrane with the control membrane, the force produced by the balancing device is transferred to the control membrane and counteracts the closure direction of the valve.

DE 100 44 922 B4 shows a further valve arrangement in which the crankcase pressure of a combustion engine is controlled by a throttle valve. The throttle valve comprises a control membrane, which on one of its sides is charged with the atmospheric pressure as a reference pressure and on its other side with the crankcase pressure. The control membrane thus divides the membrane chamber into an upper and a lower membrane chamber part. Below this partition which borders the lower membrane chamber part downwards, a valve chamber is given, which contains a valve seat connected with the suction section and which can be closed with a valve body and a valve body actuating element. The valve chamber further has a fluidic connection with the ventilation duct of the combustion engine, where an oil separator is arranged in the course of the ventilation duct. The valve body actuating element is linked to the control membrane and penetrates the partition between the lower membrane chamber and the valve chamber. The sealed penetration of the valve body actuating element through the partition there is assured by use of a sealing membrane, the effective area of which is rather small compared to the effective area of the control membrane. This is supposed to reduce the influence of additional forces acting at the sealing membrane on the control membrane.

Starting at such a valve as it is described in EP 0 724 206 A2, the present invention has the diverging object to control the inlet-sided pressure of the valve as independent as possible of the gas volume stream in the valve.

SUMMARY OF THE INVENTION

To do so, a first device, e.g. an auxiliary membrane, is provided which exerts a force on the control membrane. The auxiliary membrane at increasing pressure difference between the inlet-sided pressure of the valve and the pressure in the valve chamber especially immediately before the valve opens exerts an increasing force against the closure direction of the valve. This first device can for instance be a (first) auxiliary membrane, which is arranged in the valve chamber or at the inlet of the valve and on one of its sides is charged with the inlet-sided pressure and on the other one of its sides by the pressure in the valve chamber, respectively. This auxiliary membrane advantageously is in frictional connection and/or positive fit with the control membrane, e.g. by means of a stable rod or system of rods. This system of rods may contain several rods being arranged one next to another, which all connect the auxiliary membrane with the control membrane. In this way, a flipping or twisting of the system of rods during use is reliably prevented.

With respect to the gas flow, the auxiliary membrane advantageously is arranged in parallel to other pressure-reducing elements between the inlet of the valve and the valve chamber, e.g. parallel to oil separators. "Parallel" in this context may both mean parallel with respect to the geometric arrangement or parallel with respect to fluid mechanics, which means that the elements being arranged in parallel are subject to the same pressure conditions on both of their sides and arranged one adjacent to the other inside the same flow.

It is of course possible that further elements for the return of separated oil, e.g. a siphon, are arranged in front or behind the pressure-reducing element. Besides a parallel arrangement with respect to geometry, other arrangements are possible in which the pressure-reducing elements are neither arranged in parallel nor in close vicinity to the auxiliary membrane. Together with such elements, e.g. together with an oil separator, this membrane then partitions the valve chamber from the inlet-sided pressure. Dependent on the pressure drop at the pressure-reducing element, e.g. the oil separator, the force exerted on the auxiliary membrane is varied, which is transferred to the control membrane via the frictional connection and/or positive fit described above.

In case of an oil separator or oil-mist separator, the pressure-reducing element causes that with an increasing volume stream at the oil separator or oil-mist separator, the pressure difference due to this oil separator or oil-mist separator increases and therefore, the first auxiliary membrane exerts an increasing force against the closure direction on the control membrane. This increasing pressure drop at the oil separator or oil-mist separator, respectively, is thus compensated at least in part by a smaller pressure drop in the valve opening. Even overcompensation is possible.

According to the invention, the effective area of the auxiliary membrane may be smaller, have the same size or be larger than the effective area of the control membrane of the pressure control valve, which allows adapting the degree of compensation to the individual requirements.

If the effective area of the first auxiliary membrane is exactly the same as the effective area of the control membrane of the pressure control valve, the load deflection line of the pressure control valve advantageously is shifted that far downwards that together with the additional forces acting on the auxiliary membrane the pressure at the inlet of the valve, e.g. in a crankcase, is set in such a way that it corresponds to the pressure that without the first auxiliary membrane would result immediately before the valve opens. Thus, because of the valve, one obtains different shifts of the deflection lines for all volume streams, which ideally exactly compensate for the pressure drop at the pressure-reducing elements. As a result, for the valve chamber, one obtains exactly those pressure conditions, e.g. crankcase pressures, which would have resulted without the first auxiliary membrane as the pressure at the pressure regulating valve immediately before its opening. In this way, it is possible to prevent unacceptably high crankcase pressures or inlet-sided pressures, respectively, in many cases.

If the effective area of the first auxiliary membrane is smaller than the area of the zone of the control membrane which is charged by the pressure in the valve chamber, the load deflection lines are shifted downward, too. However, here, the pressure drop at the inlet-sided flow resistances (pressure-reducing elements) is not completely compensated.

Overcompensation results if the effective area of the first auxiliary membrane is larger than the effective area of the control membrane of the pressure control valve with respect to its valve chamber. This can be advantageous, as the load deflection lines of a normal pressure control valve known in the state of the art at higher volume streams normally show higher values than the ones of lower volume streams. This spread of the load deflection lines inherent in the system can be reduced by the overcompensation, as the individual load deflection lines of the inlet-sided pressures (e.g. of the crankcase pressures) then advantageously come closer to each other.

According to the invention, it is further possible to shift the load deflection lines by means of an optional spring, which exerts a force to the control membrane or the first auxiliary membrane which force acts against the closure direction of the valve.

In addition to the first auxiliary membrane described above, a second device, e.g. a second auxiliary membrane may be used, which on its one side is charged with the reference pressure of the control membrane and on its other side with the suction pressure or a pressure derived from the latter, especially by use of an auxiliary duct. The auxiliary duct may advantageously be arranged inside the suction duct of the valve. In this case, one does not use the suction pressure as such, as it butts as a static pressure against the lower side of the valve disk, but a suction pressure which results inside of the suction duct which duct leads to the outlet of the valve due to the Bernoulli Effect.

As a consequence, at high volume streams in the suction duct the second auxiliary membrane is charged with a negative pressure, which is more negative than the static pressure immediately below the valve disk. This causes that the degree of opening of the valve at identical suction pressure and identical volume stream is smaller than without the arrangement of the auxiliary duct inside the suction duct and as a consequence that the flow resistance of the valve is increased.

The pressure difference at the valve opening in this way rises, which means that the more negative suction pressure related to the higher volume flow is not completely transferred to the inlet of the valve and further, e.g. to the crankcase of a combustion engine. This allows that the pressure at the valve inlet even at extremely low suction pressure and high volume stream is not decreased too much.

According to the invention, the auxiliary duct which leads from the second side of the second auxiliary membrane into the suction duct is constructed as a rigid duct, which at the same time couples the second auxiliary membrane with the control membrane. To do so, it can pass through the valve disk arranged in the control membrane and be fixedly coupled with this valve disk. In this case, the auxiliary duct also provides for the mechanical coupling between the control membrane and the second auxiliary membrane and transmits the forces counteracting the closure of the valve.

It is however also possible that the second auxiliary membrane be coupled in a different manner to the control membrane, e.g. using a system of rods independent from the auxiliary duct. Further, it is possible that the auxiliary duct does not enter the suction duct via the valve opening but at a different position in the suction duct.

If the effective area of the second auxiliary membrane is smaller than the cross sectional area of the valve opening, the force exerted on the inner area (valve disk) of the control membrane is only reduced by a certain amount but not completely. As a consequence, the load deflection line of the valve in the region describing the closed state advantageously becomes more flat. If the area of the second auxiliary membrane which effectively is charged with the suction pressure or a pressure related to the latter, and the area of the valve opening have the same magnitude, the forces exerted on these areas are compensated to a large degree and the resulting force is equal to zero. In this case in the corresponding area of the load deflection line describing the closed state ideally horizontal load deflection curves result, the exact position of which only depends on the size of the area of the control membrane and optionally on an additional elastic force with the membrane size of the control membrane being defined as the area, which effectively is charged with the pressure in the valve chamber before the valve opens.

If the effective area of the second auxiliary membrane is larger than the area of the valve opening, in the closed state of the valve, the force exerted on the valve disk is overcompensated. The resulting force thus acts in the opposite direction so that in the area of the load deflection line, which describes the closed state, this load deflection line shows a positive slope. This can be advantageous for diesel engines, as there the volume flow of the blow-by-gas increases with increasing (negative) suction pressure. Higher volume flows in turn also result in higher pressure differences, e.g. at additional oil separators or other flow resistances in the ventilation duct ahead of the valve, meaning that nevertheless, dependent on the slope of the load deflection curve, an optimal crankcase pressure can be set. In such a case it is then also possible to desist from using an additional spring counteracting the closure of the valve.

In case of an open valve, the pressures exerted on the second auxiliary membrane and the valve disk, respectively, are different, as the second auxiliary membrane is not charged by the complete suction pressure, but only by the suction pressure reduced by the Bernoulli Effect.

By use of the second auxiliary membrane, the shape of the load deflection line can be influenced as is already known from the state of the art. This makes it possible to increase the cross section of the valve opening (outlet cross section) and therefore to reduce the resistance of the valve in its open state. The size of the membrane can be advantageously reduced which leads to reduced cost for material and reduced constructional dimension of the valve. With a smaller control membrane, it is further possible to use a smaller or softer spring as a supplementary element or to completely desist from the use of such an elastic element.

BRIEF DESCRIPTION OF THE DRAWINGS

The above will become readily apparent to those skilled in the art from the following detailed description when considered in the light of the accompanying drawings in which:

FIG. 1-3 show different embodiments of valves according to the invention; and FIG. 4 displays load deflection lines for a valve known in the state of the art as well as for several valves according to the invention.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1A:
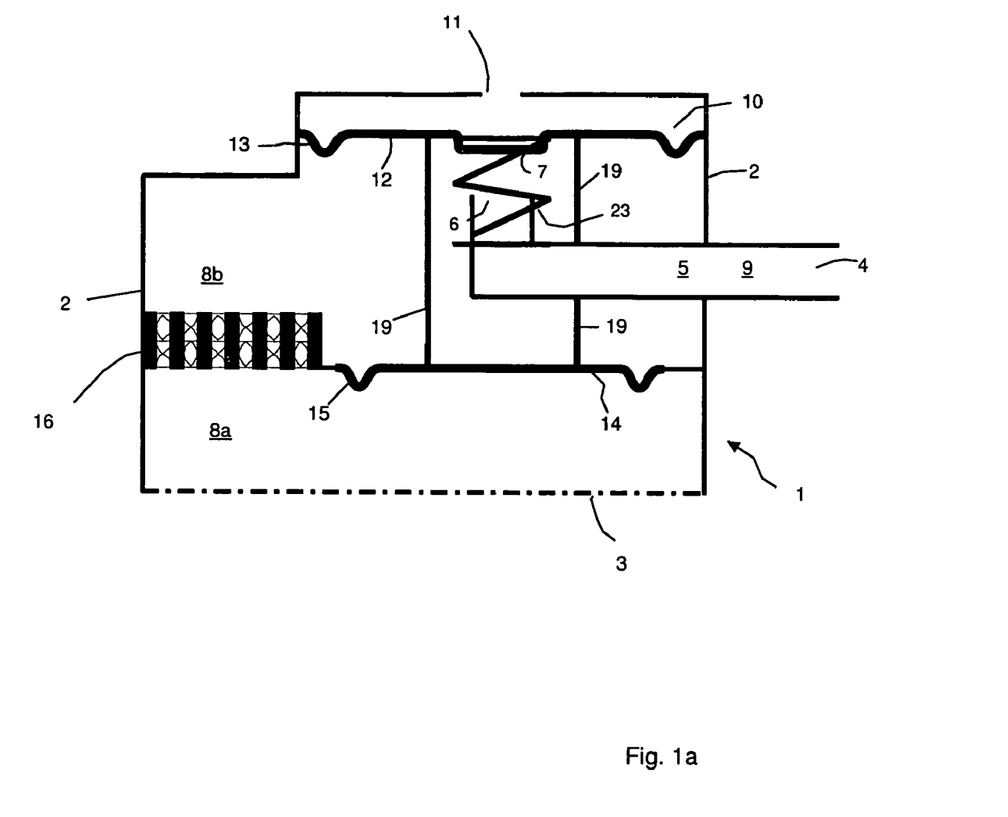

FIG. 1*a* shows a valve 1 according to the invention with a housing 2. A suction duct 5 which as an example may be connected to the suction compartment of a combustion engine and forms the outlet 4 of the valve 1, extends into the housing 2. At the other end of the suction duct, averted to the outlet 4, the opening of the suction duct 5 forms a valve opening or valve seat 6.

The housing 2 comprises an inlet opening 3 with the inlet opening 3 in FIG. 1*a* being constructed as an open lateral surface of the housing 2. This inlet opening is for instance connected to the crankcase of a combustion engine in a fluidic manner. The inlet 3 then is connected to the outlet 4 via the valve opening 6 and the suction duct 5 in a fluidic manner. The valve opening 6 divides the inner chamber of the housing 2 into a pressure chamber 8*a*, 8*b*, which is charged with the inlet-sided pressure or a pressure derived from the latter and a suction chamber 9, which is charged with the suction-sided pressure.

Such valves are controlled as is already known in the state of the art, via a control membrane 12, which above the valve opening 6 is immediately fixed in a circumferential manner at the housing 2. Immediately above the valve opening 6, a valve disk 7 is arranged, which in the embodiment shown is integrated in the membrane 12. Through upward and downward movement towards the valve opening 6 and away from the valve opening 6 the valve disk 7 closes and opens the valve opening 6. Because of this closing and opening movement, the valve disk 7 alters the flow cross section in the area of the valve opening 8.

The membrane 12, as is also known from the state of the art, along the housing 2 provides for a circumferential crease 13 via which the central part of the membrane 12 is decoupled from its terminal sections. The movements of the membrane as a consequence depend on the pressure conditions on both sides of the membrane within the area limited by the crease 13.

The membrane 12 according to the invention partitions a reference chamber 10 from the valve chamber of the valve 1 in a fluidic manner, so that within the reference chamber 10, a pressure can be set which is independent from the pressure chamber 8 and the suction chamber 9. In the example shown this pressure corresponds to the atmospheric outside pressure, which is applied by means of an opening 11 in the housing 2.

At low pressure in the pressure chamber 8b or in the suction chamber 9 (at the valve opening 6) compared to the atmospheric pressure in the chamber 10, the membrane 12 is shifted in the direction of the valve opening 6, reduces the flow cross section and finally closes the opening 6 with the valve disk 7. At this moment, the area of the valve disk 7 on the first side of the membrane is only charged with the pressure in the suction chamber 9 and no longer with the higher pressure in the pressure chamber, which results in a tight closure of the valve opening 6.

An increase of the pressure in the pressure chamber 8b affects the membrane area of the membrane 12, which extends between the crease 13 and the valve disk 7. At a sufficiently high pressure in the pressure chamber 8b, the membrane 12 is moved upwards and the valve is increasingly opened. In addition, in the example of FIG. 1a, a spring 23 is seated in the valve which exerts a force (pre-tension) to the membrane 12 with this force acting in opposite direction to the closure direction and therefore delaying the closure of the valve.

According to the invention, a first auxiliary membrane 14 is arranged within the valve 1, which together with the oil separation element 16 partitions the valve chamber of the valve 1 into two compartments 8a and 8b. The oil separation element 16 and the membrane 14 moreover are arranged in such a way, that the air entering via the inlet 3 can only access the chamber 8b of the valve chamber and therefore reach the valve opening 6 by passing through the oil separator 16.

The membrane 14 is also decoupled via a crease from its terminal regions, which means that only the pressure conditions within the area limited by the crease 15 are relevant for the deflection of the membrane 14.

The membrane 14 and the oil separator 16 divide the inner volume of the valve 1 into a chamber 8a and a chamber 8b. When gases pass through the oil separator 16, the latter causes a pressure drop so that the inlet-sided pressure in the chamber 8a, which i.e. corresponds to the crankcase pressure of a combustion engine, is reduced in the oil separator and therefore the pressure in chamber 8b immediately adjacent the valve opening 6 is lower than the pressure within chamber 8a. Accordingly, the control membrane 12 is controlled by the pressure in chamber 8b and no longer by the inlet-sided pressure in chamber 8a.

The first auxiliary membrane 14 is rigidly—in frictional connection and/or positive fit—coupled to the control membrane 12, in the example given via a system of rods 19. The coupling is achieved by use of several rods of the system 19, in order to prevent a twisting or flipping of the system of rods.

If only small volume streams occur, the pressure drop at the oil separator 16 is small and therefore also the pressure difference between the chamber 8a and the chamber 8b. The membrane 14 then will only slightly bulge towards the membrane 12 and will exert only a small force on the membrane 12 in opposite direction to the closure direction of the valve.

At high volume streams, e.g. in operational states of a combustion engine with a large amount of blow-by-gases, the pressure drop at the oil separator 16 is considerably larger, so that a higher pressure difference between the chamber 8a and 8b charges the membrane 14. The first auxiliary membrane 14 therefore now exerts a larger force on the control membrane and thus prevents an early closure of the valve 1. In this way even at a high pressure drop in the oil separator 16 it is possible to keep the pressure drop at the valve opening 6 of a valve 1 small and therewith to furthermore provide an open valve 1 to the high volume stream.

Figure 1B:
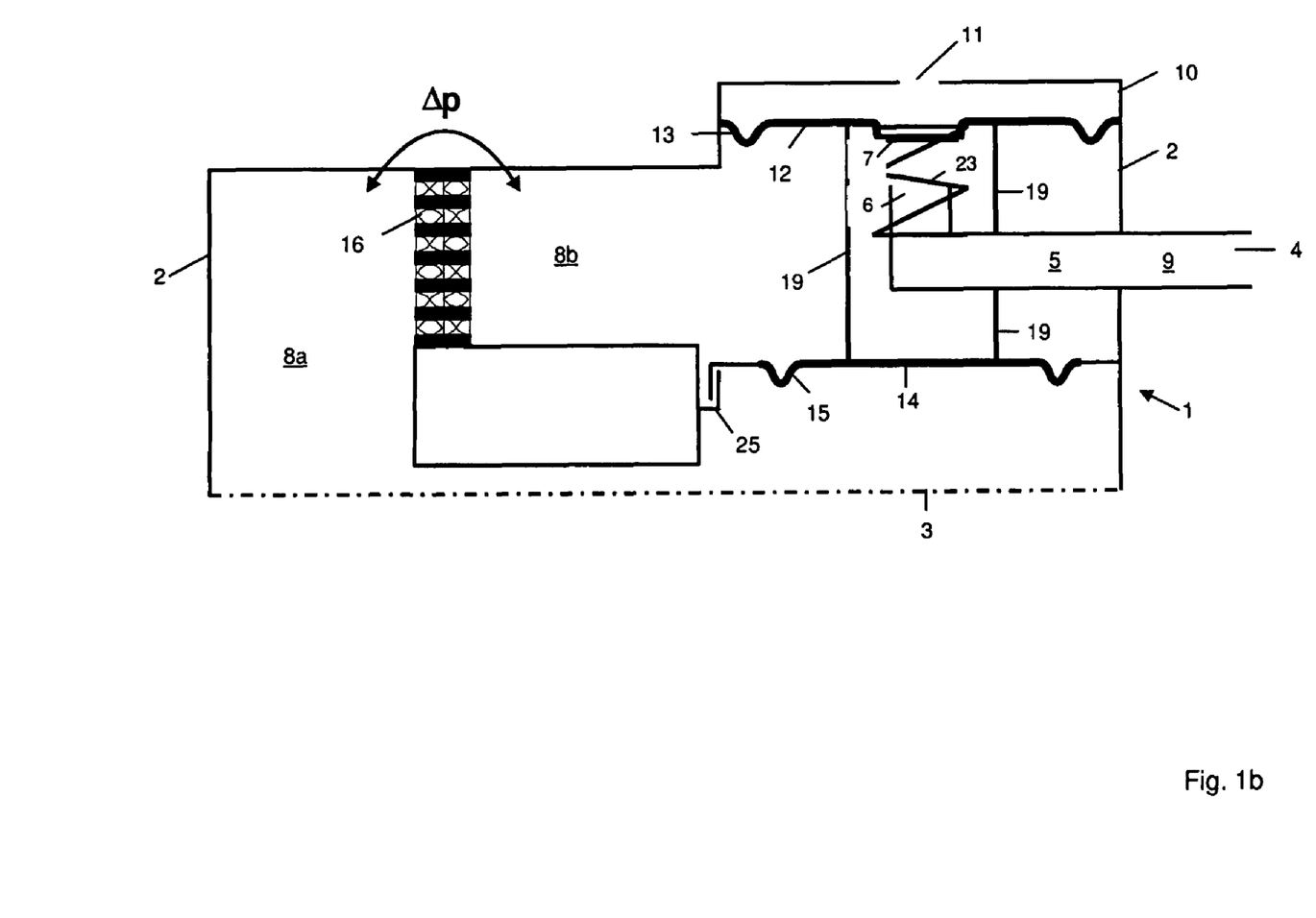

The valve shown in FIG. 1b to the largest extent corresponds to the one of FIG. 1a, except for the geometric arrangement of the oil separator 16 and the first auxiliary membrane 14, which in contrast to FIG. 1a are not arranged in parallel with respect to their position. Nevertheless, the oil separator 16 and the first auxiliary membrane 14 are in parallel with respect to fluid mechanics. Moreover, inside of the valve 1a siphon 25 is arranged for the return of separated oil into the crankcase.

Figure 2A:
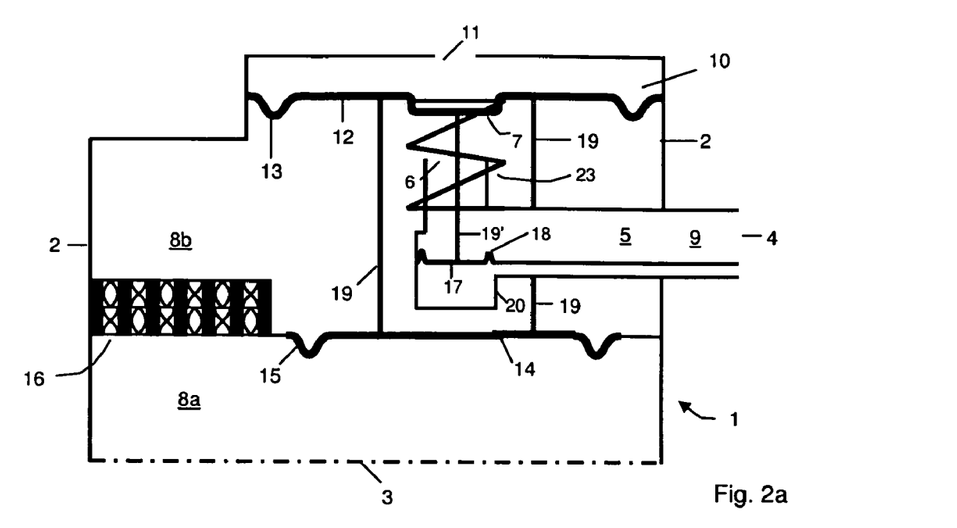
Figure 2B:
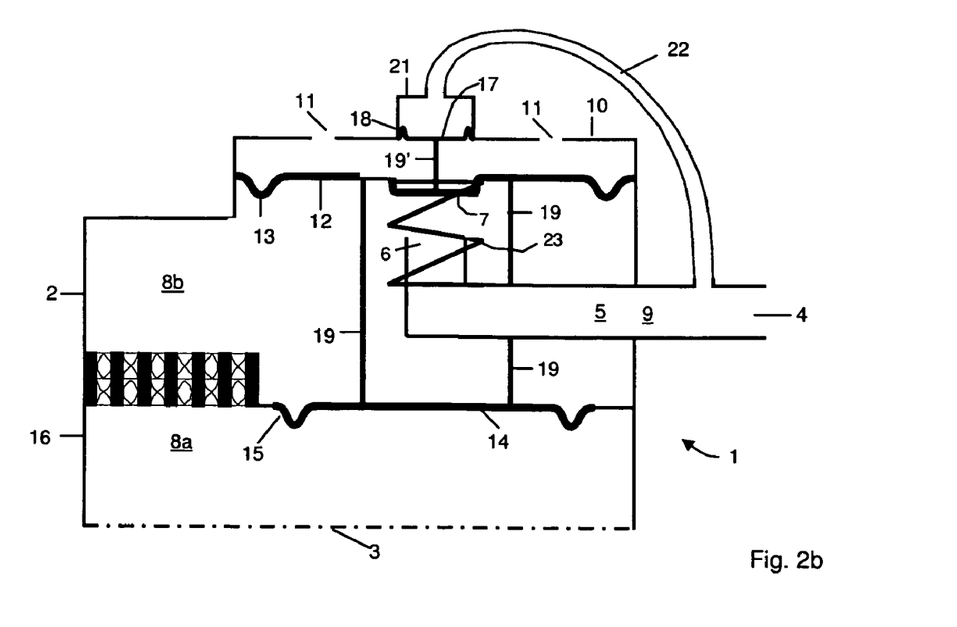
Figure 2C:
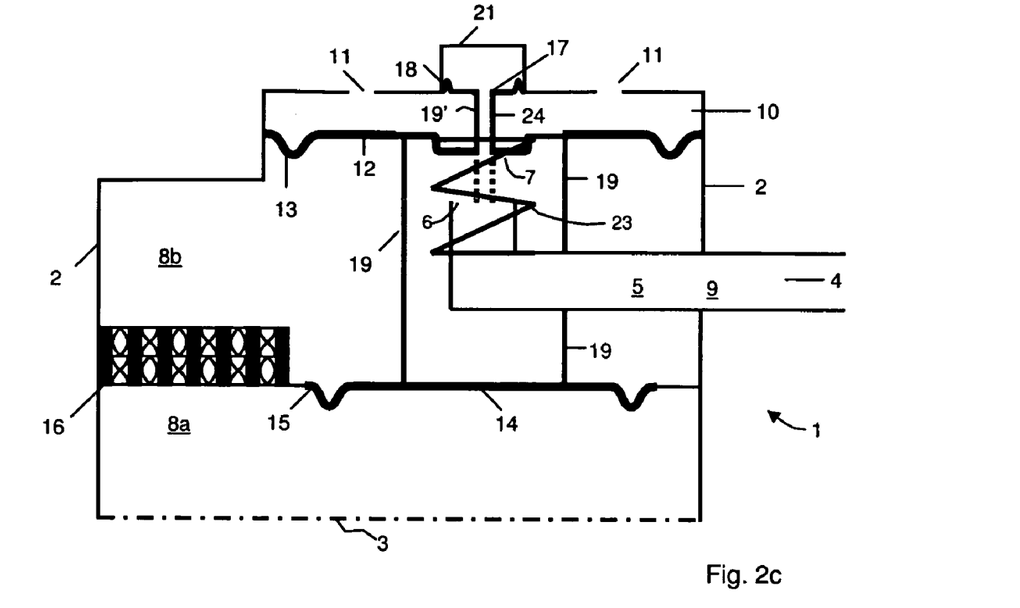

FIG. 2 in partial figures a, b and c shows further valves 1 according to the invention. In these figures as well as in the further ones, the same or similar reference numerals are used for same or similar parts as in FIG. 1. A repetition of their description is dispensed with.

The valve shown in FIG. 2a to the largest extent corresponds to the one of FIG. 1 with the exception of an additional second auxiliary membrane 17. As the other membranes, this membrane 17 is decoupled from its surroundings through a crease 18 and inside of the suction duct 5 separates a chamber 20, which is charged with the reference pressure. The membrane 17 now on its first side is charged with the reference pressure and on its second side is charged with the suction pressure in the suction duct. This second auxiliary membrane 17 is coupled to the membrane 12 by means of a system of rods 19' in frictional connection and/or positive fit so that at a decreasing suction pressure an increasing force on the membrane 12 counteracting the closure of the valve results. There, the system of rods 19' is affected by a compressive loading. This means that with a large pressure difference between the inlet 3 and the outlet 4, which is related to a high volume stream and a high pressure loss in the oil separator 16 the valve opening 6 is kept open to a larger extent than was the case without the second auxiliary membrane 17. In total, the closure is shifted.

FIG. 2b shows an embodiment in which the auxiliary membrane 17 is arranged above the control membrane 12 and separates a suction pressure chamber 21 in a fluidic manner from the reference chamber 10. This chamber 21 via the auxiliary duct 22 is connected in a fluidic manner to the outlet of the valve 1 and to the suction duct 5 so that there the first—here the lower-side of the membrane 17 is charged with the reference pressure in the chamber 10 and the opposite second side in the chamber 21 is charged with the suction pressure. The effect of the second auxiliary membrane is the same as in FIG. 2a.

In FIG. 2c, a valve is depicted which results from the one of FIG. 2b by the following modifications: the suction chamber 21 is not connected to the outlet via an auxiliary duct 22, which extends outside of and separate from chambers 8 and 10, but by constructing the mechanical coupling 19' between the second auxiliary membrane 17 and the control membrane 12 as an immersion pipe/passage pipe 24. This immersion pipe 24 extends from the second auxiliary membrane 17 to the control membrane 12 and optionally further in the direction of and/or through the valve opening 6. The chamber 21 thus is in fluidic connection with the suction pressure prevailing at the valve disk or in the suction duct 5. The effect of this arrangement is the same as the one of FIG. 2b.

As far as the immersion pipe 24 crosses the membrane 12, the valve disk 7 and through the valve opening 6 reaches into the suction duct 5, the second side of the membrane 17 is not charged with the static suction pressure which prevails immediately below the valve disk 7, but with a reduced suction pressure. Compared to the static suction pressure, this suction pressure is reduced because of the Bernoulli Effect as a function of the flow velocity, with the flow velocity resulting from the volume stream and the cross section of the valve opening 6 minus the cross section of the immersion pipe extending through the valve opening 6.

Figure 3A:
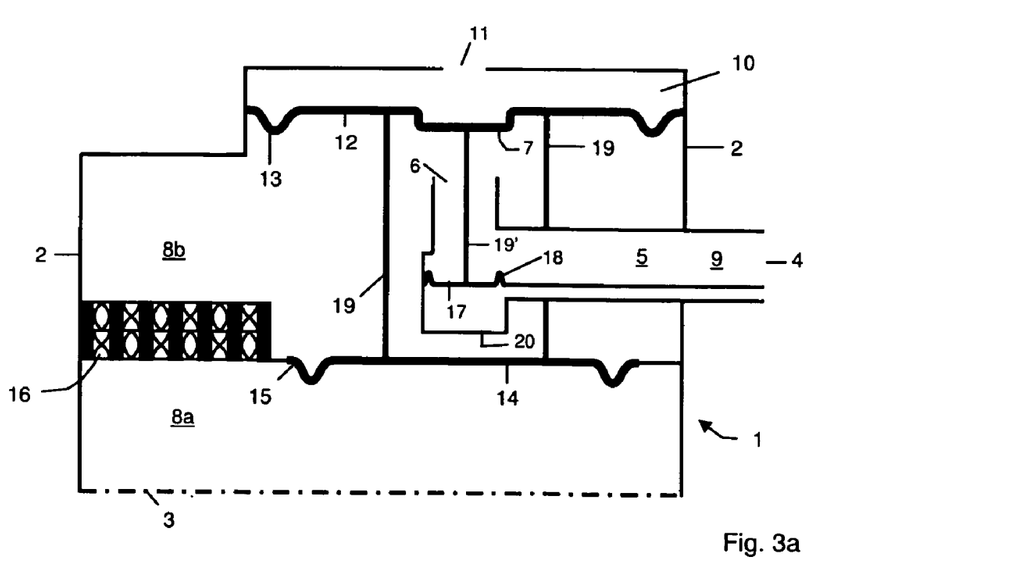
Figure 3B:
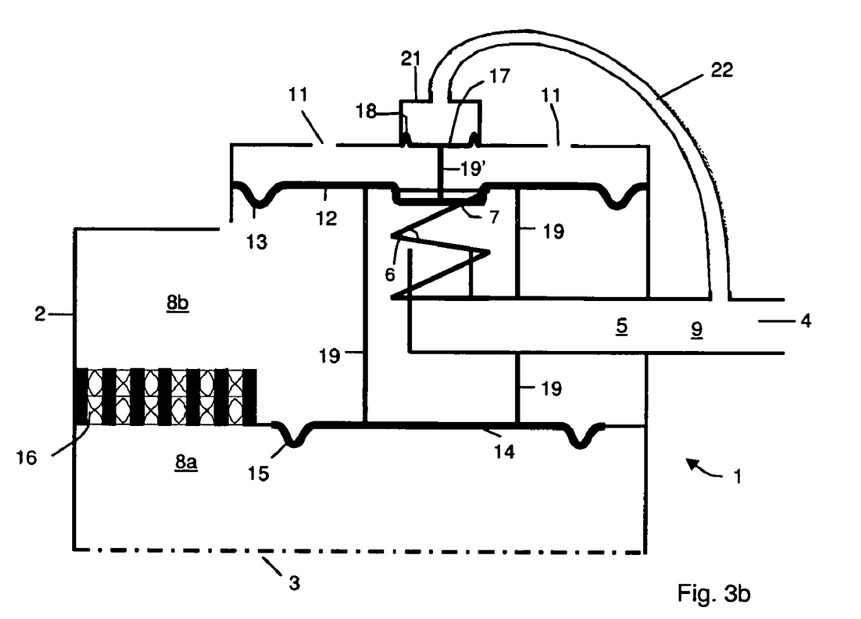
Figure 3C:
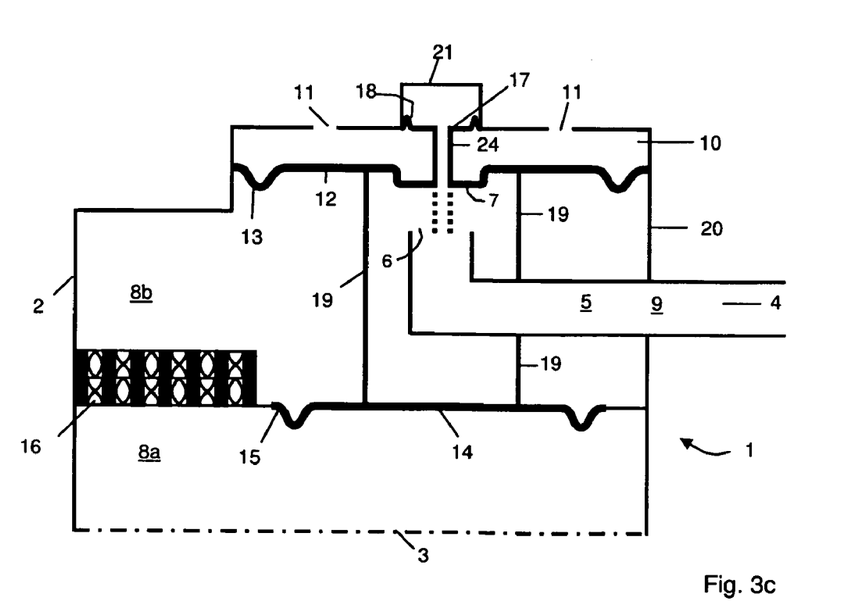

FIGS. 3a to 3c show valves 1 which almost completely correspond to the valves of FIGS. 2a to 2c. In contrast to the valves depicted in FIGS. 2a to 2c, the valves 1 of FIGS. 3a to 3c dispense with a spring 23. The combination of the first auxiliary membrane and the second auxiliary membrane 17 may cause a sufficient shift of the deflection lines of the valves 1 so that the valve goes without such a pre-tension spring 23.

Figure 4A:
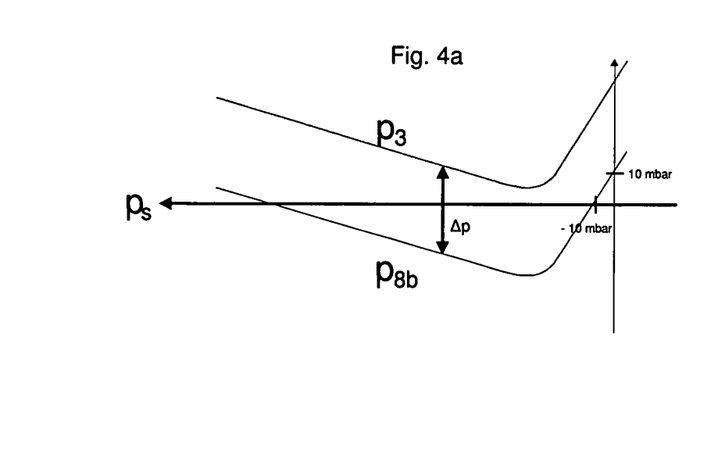

FIG. 4a schematically shows load deflection lines of a valve according to the state of the art in which an oil separator as a pressure-reducing element is arranged in the streaming way between the inlet and the outlet of the valve. The suction pressure in the suction chamber 9 is plot in the x-direction for a constant volume stream. Both load deflection lines in the y-direction show the course of the pressures—on the one hand ahead of a pressure-reducing element in a dashed representation with notation $p_3$ and on the other hand after a separation element within the pressure chamber 8b in the continuous representation with the notation $p_{8b}$. The influence of the pressure reducing element is obvious, which reduces the individual pressure values and in this way shifts the load deflection line $p_{8b}$ downward relative to the load deflection line $p_3$. The exemplary notations of the axis of 10 mbar in the x-direction and −10 mbar in the y-direction indicate a constant slope of the load deflection line in the area describing the open state.

Figure 4B:
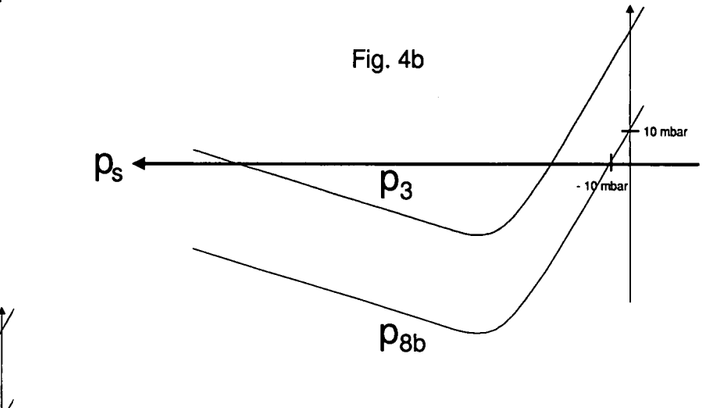

In FIG. 4b the load deflection line of a first valve according to the invention, namely according to FIG. 1a is shown. As described in FIG. 1a, it shows a first auxiliary membrane 14. The force exerted on the first auxiliary membrane which results from the pressure at the inlet 3 of the valve, e.g. the crankcase pressure, is transmitted via the mechanical coupling of the first auxiliary membrane 14 with the control membrane 12 to the latter. The additional force exerted on the control membrane against the closure direction is determined using the relationship $F=dp*A_{WH}$ with dp being the pressure difference due to the pressure-reducing elements (pressure drop at the pressure-reducing elements) and $A_{WH}$ being the effective area of the first auxiliary membrane. Compared to the state of the art, the first auxiliary membrane 14 thus compensates the pressure drop at the pressure-reducing element and the control membrane therefore can be controlled in such a way that by use of the valve according to the invention an unacceptably high crankcase pressure can be avoided.

Figure 4C:
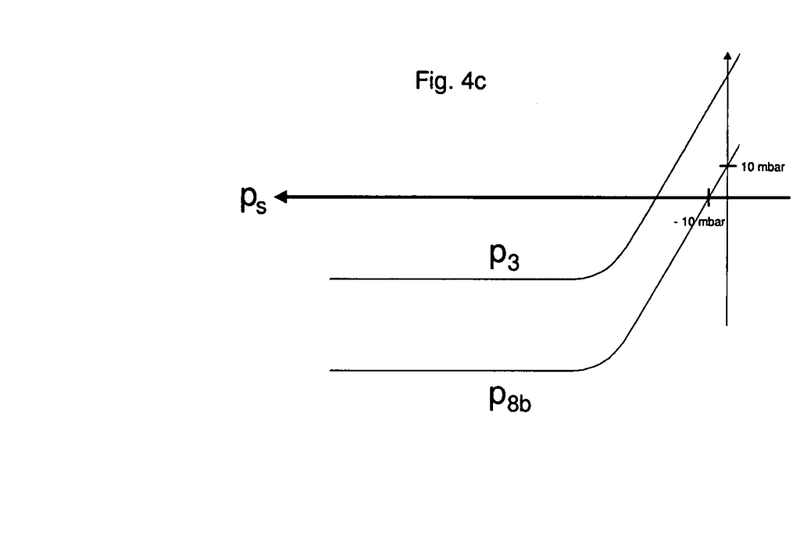

The load deflection lines shown in FIG. 4c are characteristic for the pressure course of a valve according to the further embodiments of the invention as they are shown in FIGS. 2a to 2c. These valves compared to the one of FIG. 1 are characterized by an additional second auxiliary membrane 17. The influence of the second auxiliary membrane is depicted schematically in FIG. 4c. The second auxiliary membrane is charged on one of its sides by the reference pressure which corresponds to the atmospheric pressure or a pressure related to it and on its second side by the pressure at the outlet 4. The second auxiliary membrane causes a counterforce to the closure movement of the control membrane. By suitable choice of the area ratio of the effective areas of the second auxiliary membrane 17 and the cross section of the valve opening 6, the shape of the load deflection line can be influenced. In the example of FIG. 4c these two areas have the same magnitude. This leads to a compensation of the force exerted on the valve disk in the area of the cross section of the valve opening and the load deflection line in comparison to FIG. 4b in the areas of increasingly lower suction pressures (higher negative suction pressures) has a flatter form which is almost parallel to the x-axis, thus vertical.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. Valve for the control of a gas stream, comprising: a valve housing enclosing a valve chamber, at least one pressure-sided inlet and at least one suction-sided outlet, where between the pressure-sided inlet and the suction-sided outlet at least one valve opening is arranged, which links the pressure-sided inlet with the suction-sided outlet, an elastically movable control membrane arranged at the valve housing which dependent on the pressure in the valve chamber and a reference pressure reduces or increases the flow cross section in the area of the at least one valve opening and/or opens or closes the at least one valve opening, characterized by a first device comprising an auxiliary membrane connected to the control membrane, wherein the first device exerts a first force on the control membrane in such a way that with at least one of a decreasing reference pressure and an increasing inlet pressure, the first force exerted by the first device on the control membrane in opposite direction to the closure direction of the valve increases.

2. Valve according to claim 1, wherein the valve disposes of a valve closure with the valve closure being moveable by the control membrane, with the valve seat delimiting a suction duct which suction duct connects the valve chamber with the suction-sided outlet in a fluidic manner.

3. Valve according to claim 2, wherein the valve disposes of a valve disk.

4. Valve according to claim 1, wherein between the inlet and the valve chamber at least one pressure-reducing element is arranged.

5. Valve according to claim 4, wherein between the inlet and the valve chamber at least one fluid and/or mist separator is arranged.

6. Valve according to claim 5, wherein between the inlet and the valve chamber at least one oil or oil-mist separator is arranged.

7. Valve according to claim 1, wherein the first side of the first auxiliary membrane is connected to an opening of the inlet and the second side of the first auxiliary membrane is connected to the valve chamber in a fluidic manner with the first auxiliary membrane being coupled to the control membrane in frictional connection.

8. Valve according to claim 7, wherein a second device for the exertion of a second additional force on the control membrane dependent on the pressure difference between the reference pressure and the pressure charging the outlet where with increasing pressure difference the force exerted by the second device on the control membrane in the direction opposite to the closure direction increases.

9. Valve according to claim 8, wherein the second device comprises a second auxiliary membrane, the first side of which is connected to the reference pressure and the second side of which is connected to the outlet in a fluidic manner with the second auxiliary membrane and the control membrane being coupled in frictional connection.

10. Valve according to claim 1, wherein the reference pressure is the atmospheric pressure or a pressure derived from the atmospheric pressure.

11. Valve according to claim 1, further comprising an elastic element which element exerts a pre-tension on the control membrane.

12. Valve according to claim 11, wherein said elastic element is an elastic spring.

13. Valve according to claim 11, wherein said pre-tension is a pushing or a pulling force.

\* \* \* \* \*